United States Patent [19]

Rinderer

[11] Patent Number: 5,580,014
[45] Date of Patent: Dec. 3, 1996

[54] LADDER-TYPE CABLE TRAY

[75] Inventor: Eric R. Rinderer, Highland, Ill.

[73] Assignee: B-Line Systems, Inc., Highland, Ill.

[21] Appl. No.: 549,090

[22] Filed: Oct. 27, 1995

Related U.S. Application Data

[63] Continuation of Ser. No. 171,826, Dec. 22, 1993, abandoned.

[51] Int. Cl.⁶ .................................................. F16L 3/22
[52] U.S. Cl. ............................................ 248/49; 174/68.1
[58] Field of Search ............................ 248/49, 58, 68.1, 248/72; 174/68.1; 403/255, 260

[56] References Cited

U.S. PATENT DOCUMENTS

| | | | |
|---|---|---|---|
| 2,656,998 | 10/1953 | Ullberg, Jr. | 248/68 |
| 2,905,416 | 9/1959 | Wiegand | 248/58 |
| 3,521,843 | 7/1970 | Ogle | 248/58 |
| 3,566,992 | 3/1971 | Berger | 182/228 |
| 3,680,817 | 8/1972 | Gogan | 248/68 |
| 3,938,767 | 2/1976 | Norris | 248/58 |
| 4,046,343 | 9/1977 | Kambara | 248/49 |
| 4,232,845 | 11/1980 | Turner | 248/49 |
| 4,432,519 | 2/1984 | Wright | 248/49 |
| 4,802,643 | 2/1989 | Uys | 248/49 |
| 5,100,086 | 3/1992 | Rinderer | 248/49 |

FOREIGN PATENT DOCUMENTS

| | | |
|---|---|---|
| 1323088 | 7/1973 | United Kingdom . |
| 2038441 | 7/1980 | United Kingdom . |
| 2065211 | 6/1981 | United Kingdom . |
| 2118237 | 10/1983 | United Kingdom . |

OTHER PUBLICATIONS

Atlas Cable Tray Corp., Atlas Cable Tray brochure, Mar. 1992.
Negurosu Denko K.K., B5-3-1.
Enduro, Cable Tray Systems Fittings and Accessories Brochure, published Mar. 1982, pp. 1–1 and 1–2.
Cross Line brochure.
Technical Data, "Cope Ladder", pp. 1–1 and 1–2.

*Primary Examiner*—Ramon O. Ramirez
*Attorney, Agent, or Firm*—Senniger, Powers, Leavitt & Roedel

[57] ABSTRACT

A cable tray of the present invention comprises a pair of generally parallel spaced-apart metal side rails and metal rungs extending between the rails at intervals spaced along the rails. Each metal rung has opposite ends generally abutting respective side rails and a pair of preformed openings extending inwardly from the opposite ends of the rung lengthwise of the rung. A pair of metal mechanical fasteners extend through the side rails and into respective preformed openings in the rung to fasten the rung to the side rails. Each of the openings is defined by a rung structure which, as viewed in a cross section taken transversely with respect to the rung, extends completely around the perimeter of the opening so that the perimeter of the opening is totally enclosed by the rung structure. Each of the fasteners is engageable with the rung structure defining a respective opening for securely holding the rung in fixed position with respect to its respective side rail.

22 Claims, 4 Drawing Sheets

LADDER-TYPE CABLE TRAY

This is a continuation of application Ser. No. 08/171,826, filed Dec. 22, 1993, now abandoned.

BACKGROUND OF THE INVENTION

This invention relates generally to support systems used in the construction industry, and more particularly to ladder-type cable tray used to support runs of cable, electrical wiring and the like.

Conventional ladder-type cable tray comprises a pair of parallel side rails and a series of spaced-apart rungs extending between the rails, the rails and rungs typically being of extruded aluminum (although they may also be steel parts). It has been the conventional practice in the industry to secure the rungs to the rails by welding. Welding, however, has certain disadvantages, including inconsistencies in the weld joints, the creation of noxious fumes, the need for protective equipment, high labor and capital costs, a relatively low production rate, and the need to clean the parts after the welding is complete.

Attempts have been made to fasten the rungs to the rails by screw fasteners. These attempts have involved fabricating the rungs with C-shaped or U-shaped screw holes in the ends of the rungs, and driving self-tapping screws through the side rails into these screw holes to fasten the rungs to the rails. In these prior designs, the screw holes are configured to be open along one of their sides to permit expansion of the holes to accommodate varying screw and rung tolerances. However, this open design also reduces the extent to which the screws may be tightened, which decreases the overall mechanical strength of the cable tray. Further, when the cable tray deflects under a load, the screws tend to pop through the open sides of the screw holes, which reduces the load-bearing capacity of the cable tray.

There is a need, therefore, for ladder-type cable tray which eliminates the problems associated with welding the rungs to the side rails, but which has the strength characteristics of welded cable tray.

SUMMARY OF THE INVENTION

Among the several objects of this invention may be noted the provision of improved ladder-type cable tray wherein the rungs of the tray are attached to the side rails by mechanical fasteners; the provision of such cable tray which can be produced economically at high production rates; the provision of such cable tray which eliminates the noxious fumes, inconsistent weld joints, high costs and other problems associated with welding; the provision of such cable tray which has a load capacity at least as great as conventional designs; the provision of such cable tray which is safer to fabricate than conventional designs; and the provision of such cable tray which is designed to avoid snagging or damage to items being carried by the tray.

In general, a cable tray of the present invention comprises a pair of generally parallel spaced-apart metal side rails and metal rungs extending between the rails at intervals spaced along the rails. Each metal rung has opposite ends generally abutting respective side rails and a pair of preformed openings extending inwardly from the opposite ends of the rung lengthwise of the rung. A pair of metal mechanical fasteners extend through the side rails and into respective preformed openings in the rung to fasten the rung to the side rails. Each of the openings is defined by a rung structure which, as viewed in a cross section taken transversely with respect to the rung, extends completely around the perimeter of the opening so that the perimeter of the opening is totally enclosed by the rung structure. Each of the fasteners is engageable with the rung structure defining a respective opening for securely holding the rung in fixed position with respect to its respective side rail.

Other objects and features will be in part apparent and in part pointed out hereinafter.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
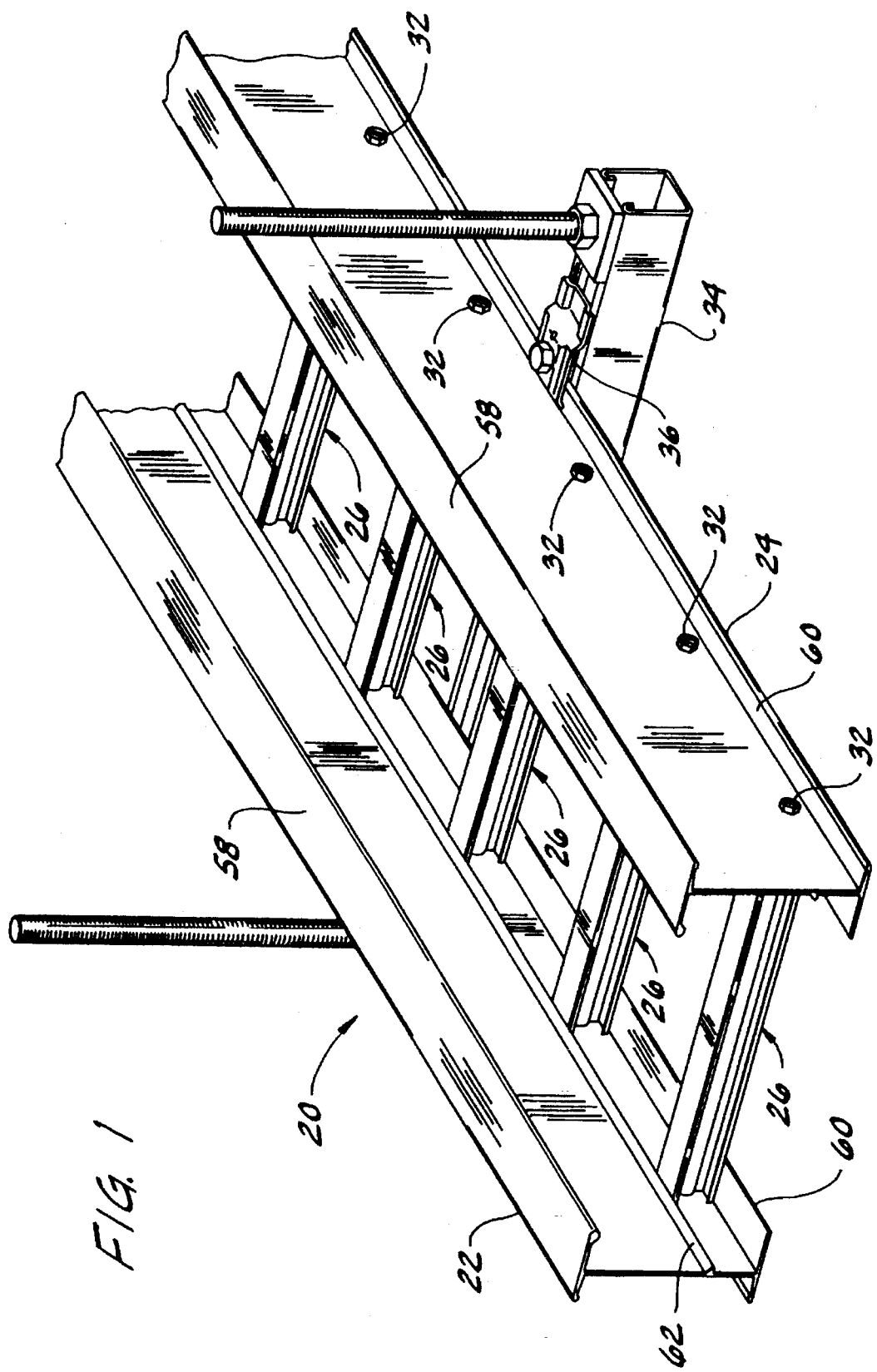
FIG. 1 is a perspective view of cable tray of the present invention.
Figure 2:
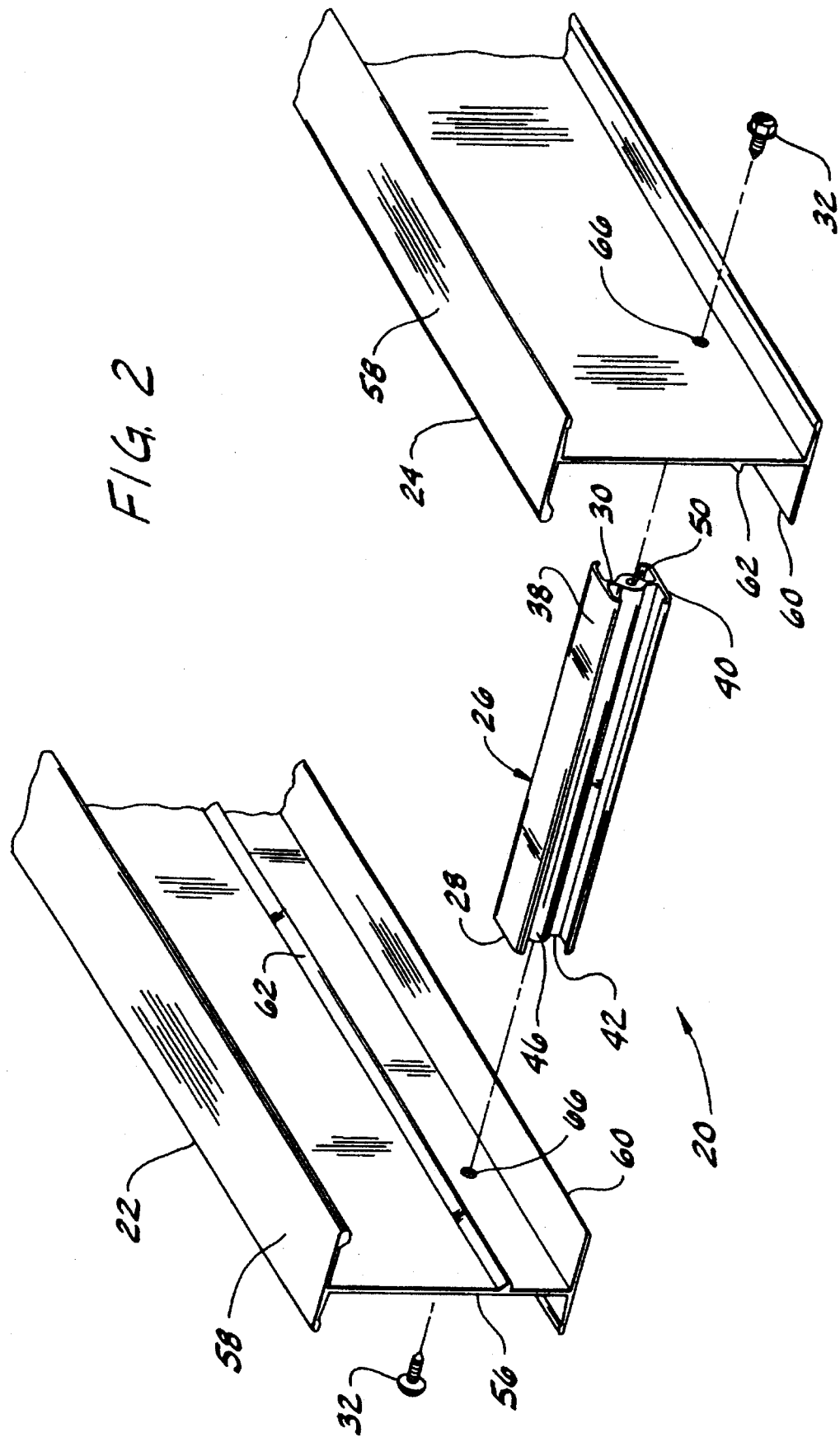
FIG. 2 is an enlarged exploded perspective view of the cable tray of FIG. 1.

Referring now to the drawings, and first more particularly to FIGS. 1 and 2, a ladder-type cable tray of the present invention is indicated in its entirety by the reference numeral 20. The cable tray 20 comprises first and second generally parallel spaced-apart metal side rails 22, 24 and a plurality of metal rungs, each designated 26, extending between the rails at intervals spaced along the rails. Each rung 26 has first and second opposite ends 28, 30 abutting the first and second side rails 22, 24, respectively. Mechanical fasteners, such as self-tapping screws 32, extend through the side rails 22, 24 and into the opposite ends 28, 30 of the rungs 26 to fasten the rungs to the side rails.

The cable tray 20 is supported by a series of support bars 34 (only one of which is shown in FIG. 1) suspended at intervals spaced lengthwise of the cable tray, the support bars extending generally crosswise relative to the rails. Hold-down members 36 are provided for securing the rails 22, 24 to the support bars 36. The support bars and hold-down members are similar to those described in U.S. Pat. No. 5,100,086 (incorporated herein by reference) and U.S. patent application Ser. No. 08/132,751 filed Oct. 6, 1993.

Figure 3:
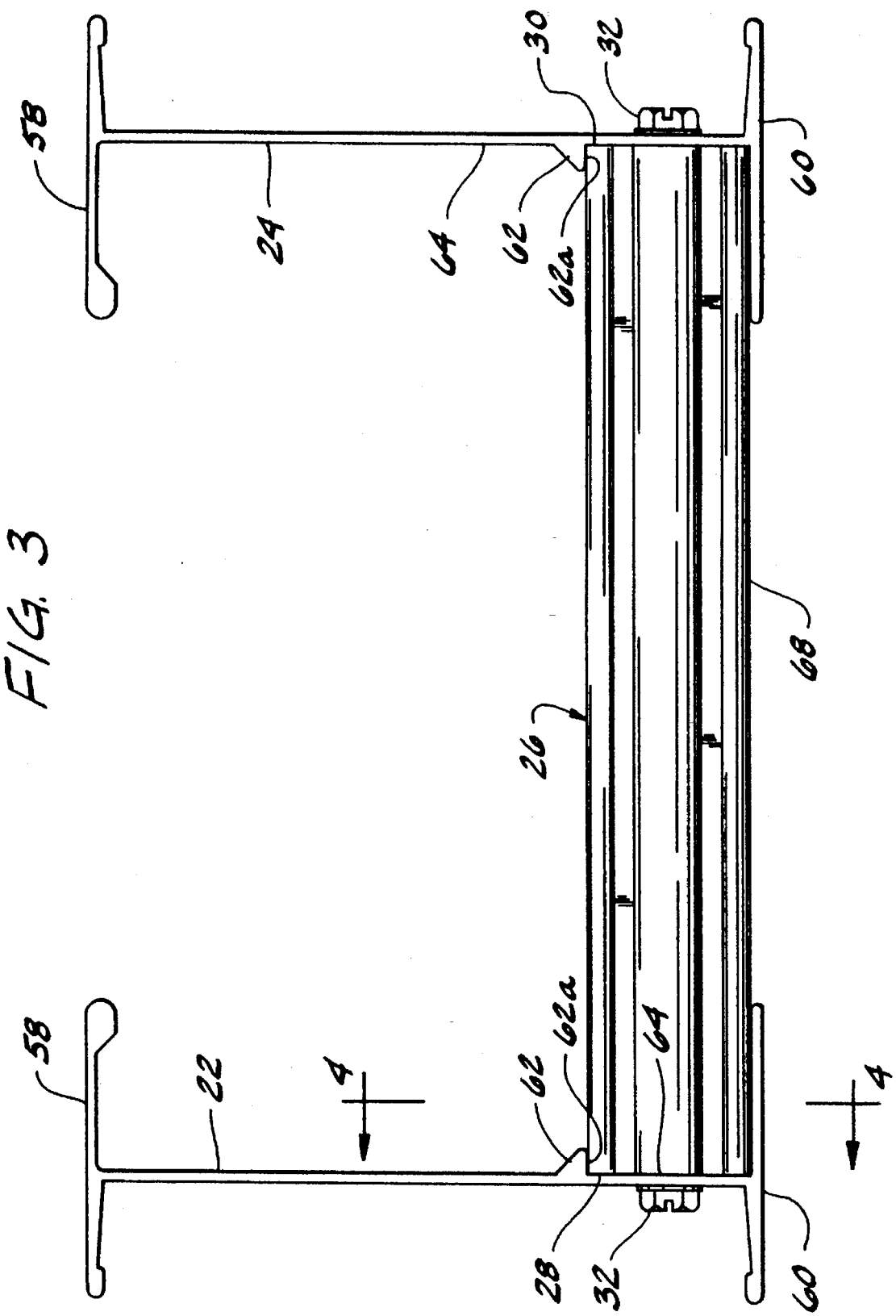
FIG. 3 is an end elevational view of the cable tray of FIG. 1.
Figure 4:
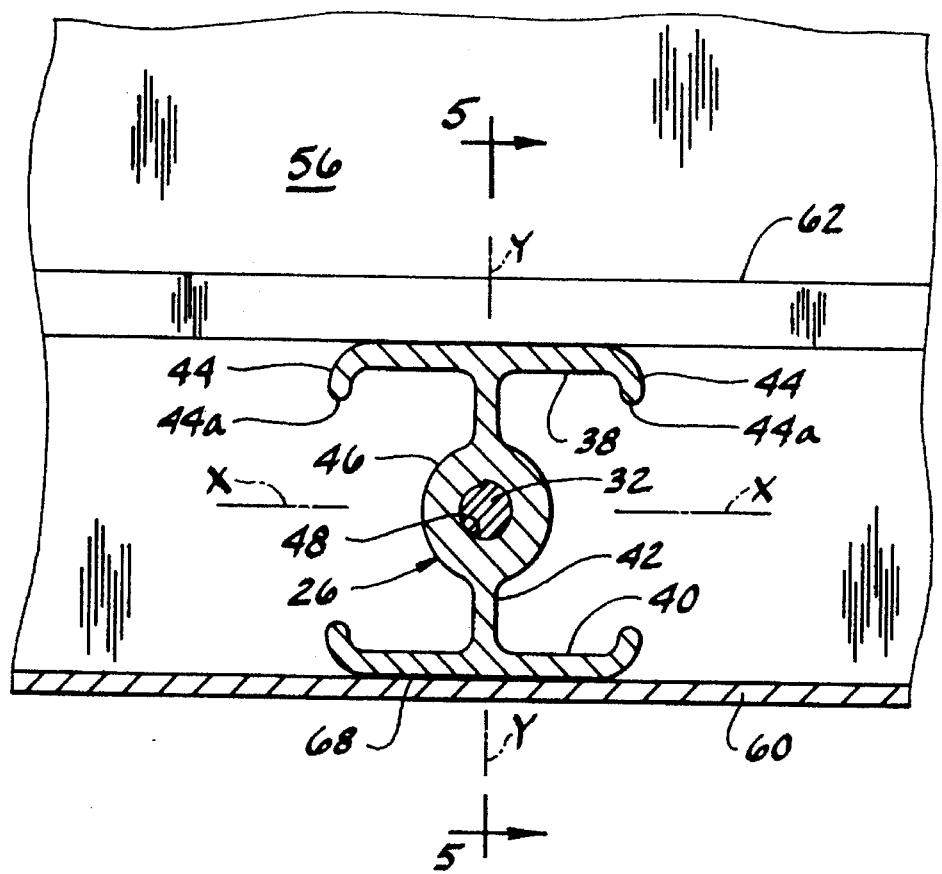
FIG. 4 is an enlarged sectional view taken along the plane of line 4—4 of FIG. 3.

As shown in FIGS. 2–4, each rung 26 has generally horizontal upper and lower flanges 38, 40 and a generally vertical web 42 connecting the two flanges. Electrical cable and wire placed in the cable tray 20 is adapted to rest on the upper flanges 38 of the rungs. Each upper flange 38 has a smooth top surface with edge margins 44 which curve downwardly to avoid snagging or damage to the electrical cable and wire. The edge margins 44 also have rounded edges 44a to avoid slicing or snagging the electrical cable and wire. The web 42 of the rung 26 lies in a central longitudinal vertical plane (designated in FIG. 4 by the line Y—Y) of the rung and the rung is symmetrical about this plane. The rung 26 is also symmetrical about a central longitudinal horizontal plane (designated in FIG. 4 by the line X—X) passing through the rung midway between the upper and lower flanges. Because of its symmetry, the rung is reversible; in other words, the upper flange 38 of the rung is identical to the lower flange 40 and the first end 28 of the rung is identical to the second end. For ease of manufacture, each rung 26 has a uniform cross section throughout its entire length.

Figure 5:
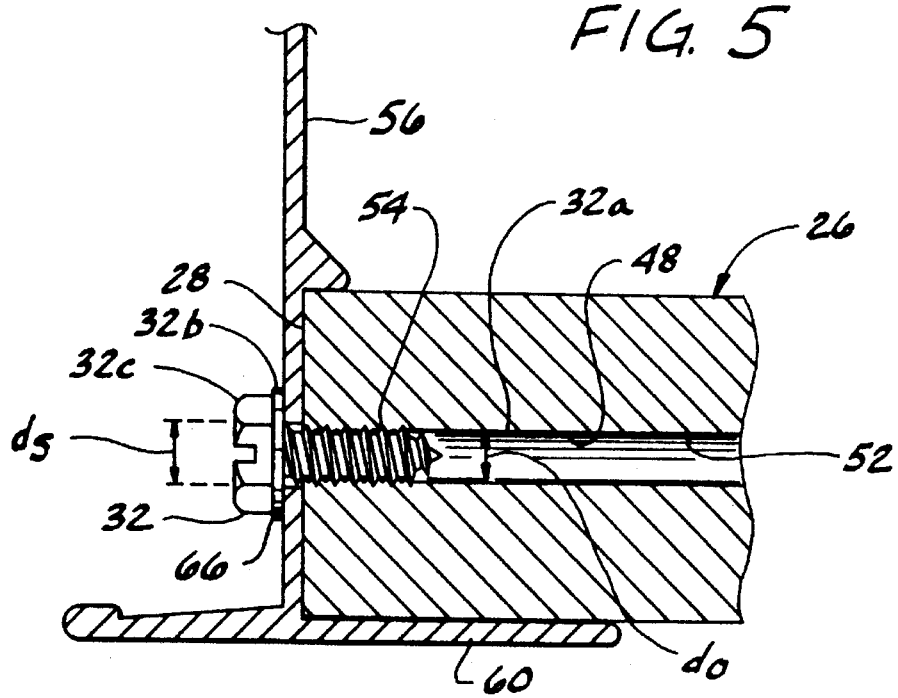
FIG. 5 is a sectional view taken along the plane of line 5—5 of FIG. 4.

A generally rigid tubular rung structure 46 is formed as an integral part of the web 42 of the rung 26 and extends continuously from one end of the rung to the other end of the rung. The rung structure 46 has first and second preformed openings 48, 50 (FIGS. 2 and 5) extending inwardly from the opposite ends 28, 30 of the rung lengthwise of the rung. Preferably, the first and second openings 48, 50 combine to constitute a single continuous hole 52 (FIG. 5) extending through the rung structure 46 from the first end 28 of the rung to the second end 30. As shown in FIG. 5, the diameter $d_o$ of the first and second openings 48, 50 (or hole 52) is somewhat smaller than the diameter $d_s$ (i.e., the major diameter) of the screw thread 32a of each screw 32. Since the screws 32 are self-tapping, the thread of each screw cuts into the corresponding rung structure 46 when driven into the opening 48, 50 to form an internal thread 54 in the rung structure. Although self-tapping screws are preferred, machine screws, alternatively, may be used if internal screw threads are tapped in the openings 48, 50 of the rung. As shown in FIG. 4, the rung structure 46 extends completely around the perimeter (circumference) of the opening so that the perimeter of the opening is totally enclosed by the rung structure to provide a strong connection between the rung structure and the screws. Preferably, the rung structure 46 and openings 48, 50 of each rung 26 are circular in transverse cross section. Alternatively, the rung structure 46 and/or openings 48, 50 may be square or polygonal in transverse cross section, or have other suitable cross-sectional shapes. In any event, the wall thickness of the tubular rung structure 46 should be sufficient (e.g., ⅛ in.) to prevent splitting of the structure in the event the fit between the screws and the openings 48, 50 are somewhat tighter than preferred due to tolerance variations. Each rung is preferably aluminum and may be formed by extrusion or other suitable method.

Each rung 26 is preferably I-shaped in transverse cross section. However, it is to be understood that, alternatively, the rung may be C-shaped, Z-shaped, or rectangular in transverse cross section, or have other suitable cross-sectional shapes.

Referring to FIGS. 2 and 3, the side rails 22, 24 are aluminum I-beams, preferably formed by extrusion. Each side rail is formed with a vertical web 56, upper and lower horizontal flanges 58, 60 extending laterally from the web on opposite sides of the web, and a shoulder 62 projecting inwardly from the web. The shoulder 62 extends along the web 56 on its inside face 64 (FIG. 3) at a location spaced above the lower flange 60 of the rail. The spacing between the shoulder 62 and lower flange 60 is selected to provide for a tight (snug) fit of a respective end of each rung 26 between the shoulder and lower flange of the rail. The shoulder 62 has a lower face 62a opposing the upper flange 38 of each rung. Each side rail 22, 24 has a plurality of holes 66 through its web 56. The holes 66 are located generally midway between the inwardly projecting shoulder 62 and lower flange 60 of the rail and at intervals spaced along the rail. The holes 66 through the webs 56 of the rails align with the openings 48, 50 in opposite ends of the rungs when the rungs are positioned with their ends between the shoulders 62 and lower flanges 60 of the rails. The screws 32 extend through the holes 66 in the rails and into the openings 48, 50 in each rung to grip (bite) the rung structure 46 and thereby secure the rung to the rails. Preferably, the diameter of each rail hole 66 (FIG. 5) is greater than the diameter $d_s$ of the screw thread 32a so that the screw thread clears the hole during insertion of the screw. Since the screw thread 32a does not threadably engage the rail, the shank 32b of the screw 32 is tensioned between the head 32c of the screw and the rung structure 46 when the screw is tightly turned in the corresponding opening of the rung structure to firmly hold the rung 26 against the web 56 of the rail.

Preferably, the lower face 62a of the shoulder 62 is horizontal. Alternatively, however, the lower face 62a may slope downwardly from the edge of the shoulder to the web 56 of the rail, thereby forming a wedge which pushes against the upper flange 38 of the rung to urge the rung against the lower flange 60 of the rail when the screw 32 is tightened in the corresponding opening of the rung structure. If the lower face of the shoulder 62 is sloped in this manner (as opposed to a horizontal lower face) a slight gap is provided between a respective end of the rung 26 and the web 56 of the rail. However, the wedging of the rung 26 between the sloped lower face of the shoulder and lower flange 60 firmly holds the rung against the rail.

Although each side rail 22, 24 is preferably I-shaped in transverse cross section, it is to be understood that, alternatively, the rails may be C-shaped or Z-shaped in transverse cross section, or have other suitable cross-sectional shapes. Also, although the rails 22, 24 and rungs 26 are preferably of extruded aluminum, the rails and rungs may be formed of other metals or alloys or formed by other methods without departing from the scope of this invention.

To assemble a cable tray of this invention, the first end 28 of each rung 26 is placed against the inside face 64 of the web 56 of the first rail 22 in a position between shoulder 62 and lower flange 60, and the second end 30 of each rung 26 is placed against the inside face 64 of the web 56 of the second rail 24 in a position between shoulder 62 and lower flange 60. Each rung 26 is oriented relative to the rails 22, 24 such that the flanges of the rungs and rails lie in planes generally parallel to one another. In other words, the lower face 68 of the lower flange 40 of each rung 26 opposes the lower flanges 60 of the side rails 22, 24, and the upper flange 38 of each rung opposes the shoulders 62 of the rails. When the rungs and rails are in proper position with respect to one another, i.e., when the openings 48, 50 in the rungs 26 are aligned with the corresponding holes 66 through the webs 56 of the rails, the screws 32 are inserted through the holes 66 and threaded into the openings 48, 50 in the rungs to firmly secure the rungs against the rails. Since each rung 26 is symmetrical about its central longitudinal vertical and horizontal planes and is uniformly shaped throughout its length, the first and second ends 28, 30 of the rung are identical and the upper and lower flanges 38, 40 of the rung are identical. Thus, the orientation of the rung 26 relative to the rails 22, 40 is the same regardless of which end of the rung is secured to which rail and regardless of which flange of the rung opposes the shoulders 62 of the rails. Since the rungs 26 are easily oriented relative to the rails and secured to the rails by screws, cable tray of the present invention can be produced economically at high production rates.

A cable tray of the present invention has a load capacity at least as great as conventional designs. However, because the cable tray is assembled without the need for welding, noxious fumes, inconsistent weld joints and other problems associated with welding are eliminated.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Cable tray comprising a pair of generally parallel spaced-apart metal side rails, metal rungs extending between the rails at intervals spaced along the rails, each metal rung having opposite ends generally abutting respective side rails, a pair of preformed fastener openings in each rung extending inwardly from opposite ends of the rung lengthwise of the rung, and a pair of metal screw fasteners each comprising a head and a threaded shank, the shanks of the screw fasteners extending from their respective heads through the side rails and into respective preformed fastener openings in the rung to fasten the rung to the side rails, each of said fastener openings being defined by a metal rung structure which, as viewed in a cross section taken transversely with respect to the rung and with respect to a central axis of the opening, extends completely around the fastener opening so that the fastener opening has a closed perimeter for preventing any significant non-axial movement of the screw fastener relative to the fastener opening, each of said metal screw fasteners biting into the metal rung structure and being tightly threaded into its respective fastener opening for tensioning of its shank between its head and the rung structure to pull a respective end of the rung tightly against a respective side rail to thereby securely hold the rung in fixed position with respect to said respective side rail.

2. Cable tray as set forth in claim 1 wherein each rung is an extruded part which is substantially uniform in transverse cross section from one end of the rung to the other.

3. Cable tray as set forth in claim 2 wherein the side rails and rungs are extruded aluminum parts.

4. Cable tray as set forth in claim 1 wherein each rung has, in transverse cross section, upper and lower flanges and a web connecting the two flanges, said rung structure being formed as an integral part of the web.

5. Cable tray as set forth in claim 4 wherein said rung structure comprises a single tubular structure extending continuously from one end of the rung to the other end of the rung.

6. Cable tray as set forth in claim 5 wherein said web is generally vertical and lies in the central longitudinal plane of the rung.

7. Cable tray as set forth in claim 6 wherein said rung is symmetrical about the central longitudinal plane of the rung.

8. Cable tray as set forth in claim 7 wherein said rung structure is circular in transverse cross section.

9. Cable tray as set forth in claim 1 wherein said fasteners are self-tapping screws.

10. Cable tray as set forth in claim 1 wherein each of said openings is round in transverse cross section.

11. Cable tray as set forth in claim 1 wherein each of said fasteners is engageable with the rung structure continuously around the periphery of such fastener.

12. Cable tray comprising a pair of generally parallel spaced-apart metal side rails, metal rungs extending between the rails at intervals spaced along the rails, each metal rung having opposite ends generally abutting respective side rails and having, in transverse cross section, upper and lower flanges and a web connecting the two flanges, a pair of preformed fastener openings in each rung extending inwardly from opposite ends of the rung lengthwise of the rung, and a pair of metal mechanical fasteners extending through the side rails and into respective preformed fastener openings in the rung to fasten the rung to the side rails, each of said fastener openings being defined by a metal rung structure which, as viewed in a cross section taken transversely with respect to the rung and with respect to a central axis of the opening, extends completely around a perimeter of the fastener opening so that the perimeter of the opening is totally enclosed by the rung structure, said rung structure being formed as an integral part of the web, each of said fasteners being engageable with the rung structure defining a respective opening for securely holding the rung in fixed position with respect to its respective side rail.

13. Cable tray as set forth in claim 12 wherein said rung structure comprises a single tubular structure extending continuously from one end of the rung to the other end of the rung.

14. Cable tray as set forth in claim 13 wherein said web is generally vertical and lies in the central longitudinal plane of the rung.

15. Cable tray as set forth in claim 14 wherein said rung is symmetrical about the central longitudinal plane of the rung.

16. Cable tray as set forth in claim 15 wherein said rung structure is generally circular in transverse cross section.

17. Cable tray as set forth in claim 12 wherein each rung is an extruded part which is substantially uniform in transverse cross section from one end of the rung to the other.

18. Cable tray comprising a pair of generally parallel spaced-apart metal side rails, each side rail comprising upper and lower flanges and a web connecting the two flanges, metal rungs extending between the rails at intervals spaced along the rails, each metal rung having opposite ends generally abutting respective side rails, each side rail being formed with a shoulder extending along the web of the rail on an inside face of the rail at a location spaced above the lower flange of the rail, the spacing between the shoulder and the lower flange being such as to provide for a tight fit of each rung between the shoulder and the lower flange, a pair of preformed fastener openings in each rung extending inwardly from opposite ends of the rung lengthwise of the rung, and a pair of metal mechanical fasteners extending through the webs of the side rails and into respective preformed fastener openings in the rung to fasten the rung to the side rails, each of said fastener openings being defined by a metal rung structure which, as viewed in a cross section taken transversely with respect to the rung and with respect to a central axis of the opening, extends completely around the fastener opening so that the fastener opening has a closed perimeter for preventing any significant non-axial movement of the mechanical fastener relative to the fastener opening, each of said fasteners being engageable with the rung structure defining a respective opening for securely holding the rung in fixed position with respect to its respective side rail.

19. Cable tray as set forth in claim 18 wherein each side rail is I-shaped in transverse cross section.

20. Cable tray comprising a pair of generally parallel spaced-apart metal side rails, metal rungs extending between the rails at intervals spaced along the rails, each metal rung having opposite ends generally abutting respective side rails, a pair of preformed fastener openings in each rung extending inwardly from opposite ends of the rung lengthwise of the rung, and a pair of metal screw fasteners each comprising a head and a threaded shank, the shanks of the screw fasteners extending from their respective heads through the side rails and into respective preformed fastener openings in the rung to fasten the rung to the side rails, each of said fastener openings being defined by a metal rung structure which, as viewed in a cross section taken transversely with respect to the rung and with respect to a central axis of the opening, extends completely around a perimeter of the fastener opening so that the perimeter of the fastener opening is totally enclosed by the rung structure, the perimeter of the fastener opening being closed and having a circumference not substantially greater than the circumference of a respective fastener for preventing non-axial movement of the fastener relative to the fastener opening, each of said metal screw fasteners biting into the metal rung structure and being tightly threaded into its respective fastener opening for tensioning of its shank between its head and the rung structure to pull a respective end of the rung tightly against a respective side rail to thereby securely hold the rung in fixed position with respect to said respective side rail.

21. Cable tray comprising a pair of generally parallel spaced-apart metal side rails, metal rungs extending between the rails at intervals spaced along the rails, each metal rung having opposite ends generally abutting respective side rails, a pair of preformed fastener openings in each rung extending inwardly from opposite ends of the rung lengthwise of the rung, and a pair of mechanical fasteners extending through the side rails and into respective preformed fastener openings in the rung to fasten the rung to the side rails, each rung comprising a flange engageable by electrical cable supported by the cable tray, and a metal rung structure disposed below the flange, each of said fastener openings having a closed perimeter defined in its entirety by the rung structure independent of the flange, each of said fasteners being engageable with the rung structure for securely holding the rung in fixed position with respect to its respective side rail.

22. Cable tray as set forth in claim 21 wherein said mechanical fasteners comprise metal screw fasteners each having a head and a threaded shank extending from the head through a respective side rail and into a respective fastener opening, each of said metal screw fasteners biting into the metal rung structure and being tightly threaded into its respective fastener opening for tensioning of its shank between its head and the rung structure to pull a respective end of the rung tightly against a respective side rail to thereby securely hold the rung in fixed position with respect to said respective side rail.

* * * * *